(12) United States Patent
Martinez

(10) Patent No.: US 8,011,727 B1
(45) Date of Patent: Sep. 6, 2011

(54) THERMAL CHILD SEAT BLANKET APPARATUS

(76) Inventor: Yesenia C. Martinez, Brownsville, TX (US)

( * ) Notice: Subject to any disclaimer, the term of this patent is extended or adjusted under 35 U.S.C. 154(b) by 163 days.

(21) Appl. No.: 12/611,216

(22) Filed: Nov. 3, 2009

(51) Int. Cl.
*A47C 31/11* (2006.01)
*A47C 7/66* (2006.01)
*A47C 7/74* (2006.01)

(52) U.S. Cl. ......... 297/219.12; 297/180.11; 297/180.12; 297/184.13

(58) Field of Classification Search ............... 297/180.1, 297/180.11, 180.12, 184.13, 219.12
See application file for complete search history.

(56) References Cited

U.S. PATENT DOCUMENTS

| | | | | |
|---|---|---|---|---|
| 4,335,725 A | * | 6/1982 | Geldmacher | 297/180.11 X |
| 4,883,701 A | * | 11/1989 | Rankin et al. | 297/219.12 X |
| 4,885,200 A | * | 12/1989 | Perdelwitz et al. | 297/219.12 X |
| 4,891,454 A | * | 1/1990 | Perdelwitz et al. | 297/219.12 X |
| 4,892,769 A | * | 1/1990 | Perdelwitz et al. | 297/219.12 X |
| D335,965 S | | 6/1993 | Spring | |
| 5,516,189 A | * | 5/1996 | Ligeras | 297/180.11 |
| 5,522,639 A | * | 6/1996 | Jaime | 297/184.13 |
| 5,613,730 A | * | 3/1997 | Buie et al. | 297/180.12 |
| 5,692,952 A | * | 12/1997 | Chih-Hung | 297/180.11 X |
| 5,730,490 A | * | 3/1998 | Mortenson | 297/184.13 |
| 5,897,162 A | * | 4/1999 | Humes et al. | 297/180.12 |
| 5,956,766 A | | 9/1999 | Benway | |
| 6,019,421 A | * | 2/2000 | Roh | 297/184.13 |
| 6,039,393 A | * | 3/2000 | Roh | 297/184.13 |
| 6,073,998 A | * | 6/2000 | Siarkowski et al. | 297/180.12 |
| 6,127,655 A | * | 10/2000 | Humes et al. | 297/180.12 X |
| 6,189,967 B1 | * | 2/2001 | Short | 297/180.11 X |
| 6,209,953 B1 | * | 4/2001 | Mackay et al. | 297/184.13 |
| 6,481,791 B1 | | 11/2002 | Facchini et al. | |
| 6,517,153 B1 | * | 2/2003 | Brewer | 297/184.13 |
| D477,744 S | | 7/2003 | Kelly | |
| 6,702,374 B2 | | 3/2004 | Karns | |
| 6,848,746 B2 | * | 2/2005 | Gentry | 297/180.11 X |
| 7,070,231 B1 | * | 7/2006 | Wong | 297/180.11 |
| 7,131,187 B2 | * | 11/2006 | Check et al. | 297/180.12 X |
| 7,134,715 B1 | * | 11/2006 | Fristedt et al. | 297/180.12 |
| 7,204,550 B2 | * | 4/2007 | Kassai et al. | 297/180.11 |
| 7,284,790 B1 | * | 10/2007 | Brewer | 297/184.13 |
| 7,422,277 B2 | * | 9/2008 | Chen | 297/180.12 |
| 7,438,356 B2 | * | 10/2008 | Howman et al. | 297/180.11 |
| 7,677,661 B1 | * | 3/2010 | Ferrari-Cicero et al. | 297/219.12 |
| 7,823,967 B2 | * | 11/2010 | Parnis et al. | 297/180.12 |
| 7,891,732 B2 | * | 2/2011 | Hei et al. | 297/184.13 |
| 7,914,075 B2 | * | 3/2011 | Danziger | 297/219.12 |
| 2007/0013213 A1 | * | 1/2007 | Axinte et al. | 297/180.12 |
| 2007/0152479 A1 | * | 7/2007 | Howman et al. | 297/180.11 |
| 2010/0038939 A1 | * | 2/2010 | Kim | 297/184.13 |
| 2010/0072793 A1 | * | 3/2010 | Kress | 297/184.13 |
| 2010/0133883 A1 | * | 6/2010 | Walker | 297/180.1 |
| 2010/0283295 A1 | * | 11/2010 | Smith et al. | 297/180.12 X |
| 2011/0101742 A1 | * | 5/2011 | Hei et al. | 297/184.13 |

* cited by examiner

*Primary Examiner* — Rodney B White
(74) *Attorney, Agent, or Firm* — Crossley Patent Law; Mark A. Crossley

(57) ABSTRACT

The thermal child seat blanket apparatus provides snug, removable fit to an exiting child seat. The choice of battery power or power via the cigar plug of an auto yields widespread user choices. After setting the initially desired temperature of the heating elements, the temperature is easily moved up or down via the touch control temperature increase and temperature decrease. The seat cover can be used with or without the blanket. While the apparatus is ideally suited for fit to a portable child seat, it may nonetheless by used in any desired application to warm and shelter a child, whether in or out of a seat. The flexible seat cover, blanket, and collapsible accordion shield provide compact portability.

2 Claims, 5 Drawing Sheets

US 8,011,727 B1

THERMAL CHILD SEAT BLANKET APPARATUS

BACKGROUND OF THE INVENTION

Portable child seats are quite widely used in conveying young children and in providing a resting place within a variety of circumstances. Typically, for one example, a child is placed in a child seat, transported to an auto, strapped in to the auto, driven to a destination, then removed from the auto. In the event of inclement weather, especially cold weather, a child must be bundled for conveyance to the auto, unbundled once strapped into the auto, then bundled again for transport from the auto, all of which are tiresome, time consuming, and often irritating to the child, especially a sleeping young child. The present apparatus solves such problems by providing a removable thermal child seat cover and removable thermal blanket that are powered by either battery or an auto's electrical system.

FIELD OF THE INVENTION

The thermal child seat blanket apparatus relates to portable child seats such as those used in autos and the like, and more especially to a thermal cover for portable child seats.

SUMMARY OF THE INVENTION

The general purpose of the thermal child seat blanket apparatus, described subsequently in greater detail, is to provide a thermal child seat blanket apparatus which has many novel features that result in an improved thermal child seat blanket apparatus which is not anticipated, rendered obvious, suggested, or even implied by prior art, either alone or in combination thereof.

To attain this, the thermal child seat blanket apparatus provides for snug, removable fit to an exiting child seat. The choice of battery power or power via the cigar plug of an auto yields widespread user choices. The plurality of elongated openings in the seat cover and inner layer provide for fit to a variety of harnesses and for a plurality of child sizes. After setting the initially desired temperature of the heating elements, the temperature is easily moved up or down via the touch control temperature increase and decrease. The seat cover can be used with or without the blanket.

The removable accordion shield of the apparatus provides more than one advantage. First, the shield can shield a child from inclement weather conditions more fully than can the seat cover and the blanket. Second, as a child is already warmed when removed from an auto, the shield can be used to maintain that warmth for an extended period of time without the apparatus turned on.

While the apparatus is ideally suited for fit to a portable child seat, it may nonetheless by used in any desired application to warm and shelter a child, whether in or out of a seat. The flexible seat cover, blanket, and collapsible accordion shield provide compact portability. The seat cover, blanket, and accordion shield are constructed of breathable, water resistant materials.

Thus has been broadly outlined the more important features of the improved thermal child seat blanket apparatus so that the detailed description thereof that follows may be better understood and in order that the present contribution to the art may be better appreciated.

An object of the thermal child seat blanket apparatus is to provide warmth for a child in a portable child seat.

Another object of the thermal child seat blanket apparatus is to provide shelter for a young child in an existing child seat.

A further object of the thermal child seat blanket apparatus is to snugly and removably fit an existing child seat.

An added object of the thermal child seat blanket apparatus is to warm below and above a child.

And, an object of the thermal child seat blanket apparatus is to provide collapsible protection above a child.

These together with additional objects, features and advantages of the improved thermal child seat blanket apparatus will be readily apparent to those of ordinary skill in the art upon reading the following detailed description of presently preferred, but nonetheless illustrative, embodiments of the improved thermal child seat blanket apparatus when taken in conjunction with the accompanying drawings.

In this respect, before explaining the current embodiments of the improved thermal child seat blanket apparatus in detail, it is to be understood that the thermal child seat blanket apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved thermal child seat blanket apparatus. It is therefore important that the claims be regarded as including such equivalent constructions insofar as they do not depart from the spirit and scope of the thermal child seat blanket apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the thermal child seat blanket apparatus generally designated by the reference number 10 will be described.

Figure 1:
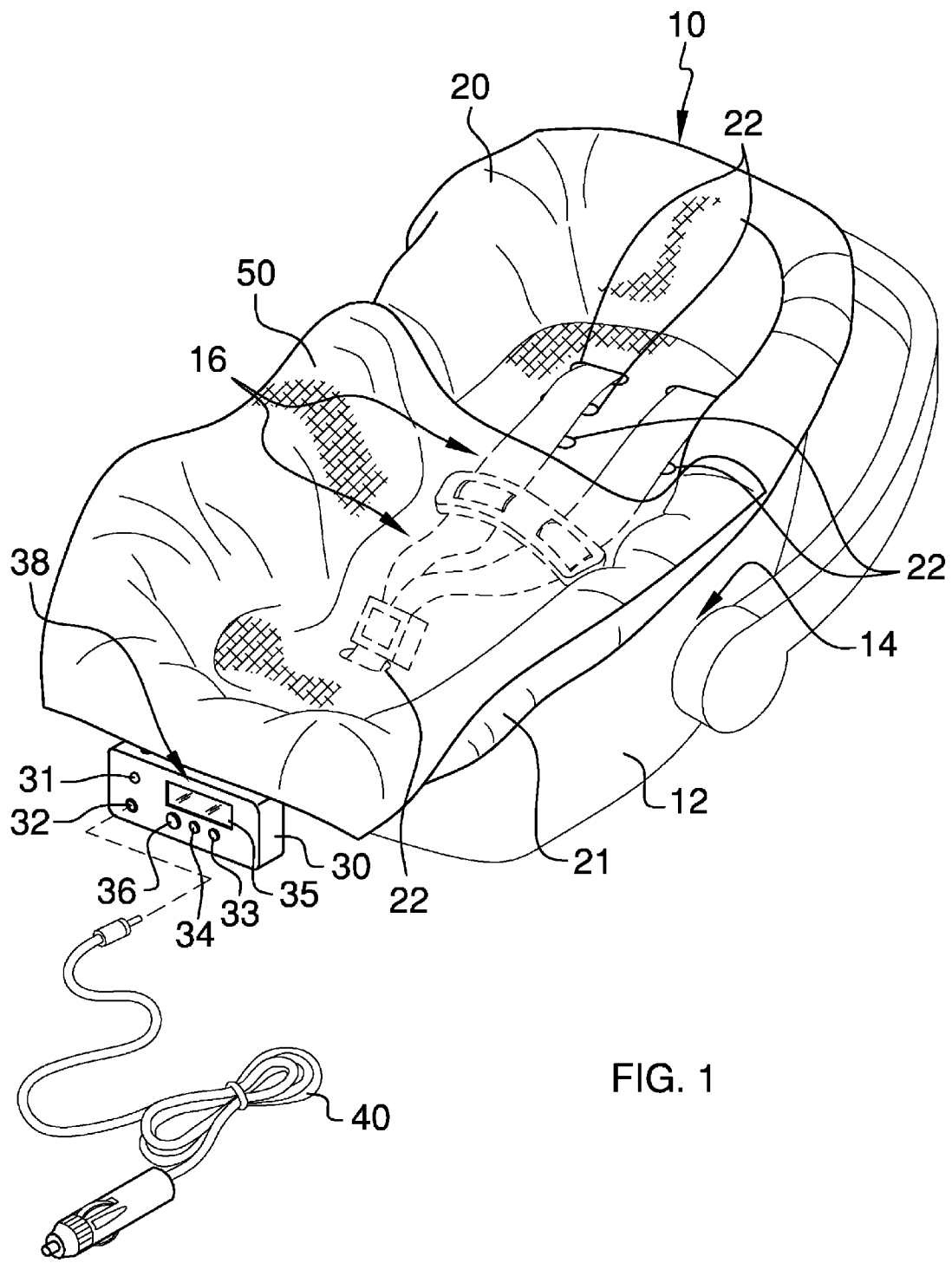
FIG. 1 is a perspective view of the seat cover and blanket fitted to an existing child seat.

Referring to FIG. 1, the apparatus 10 partially comprises the pliable seat cover 20 having a perimeter 21. The elastic band 28 is disposed within the perimeter 21. The seat cover 20 with elastic band 28 perimeter 21 is removably disposed over an existing child seat 12.

Figure 3:
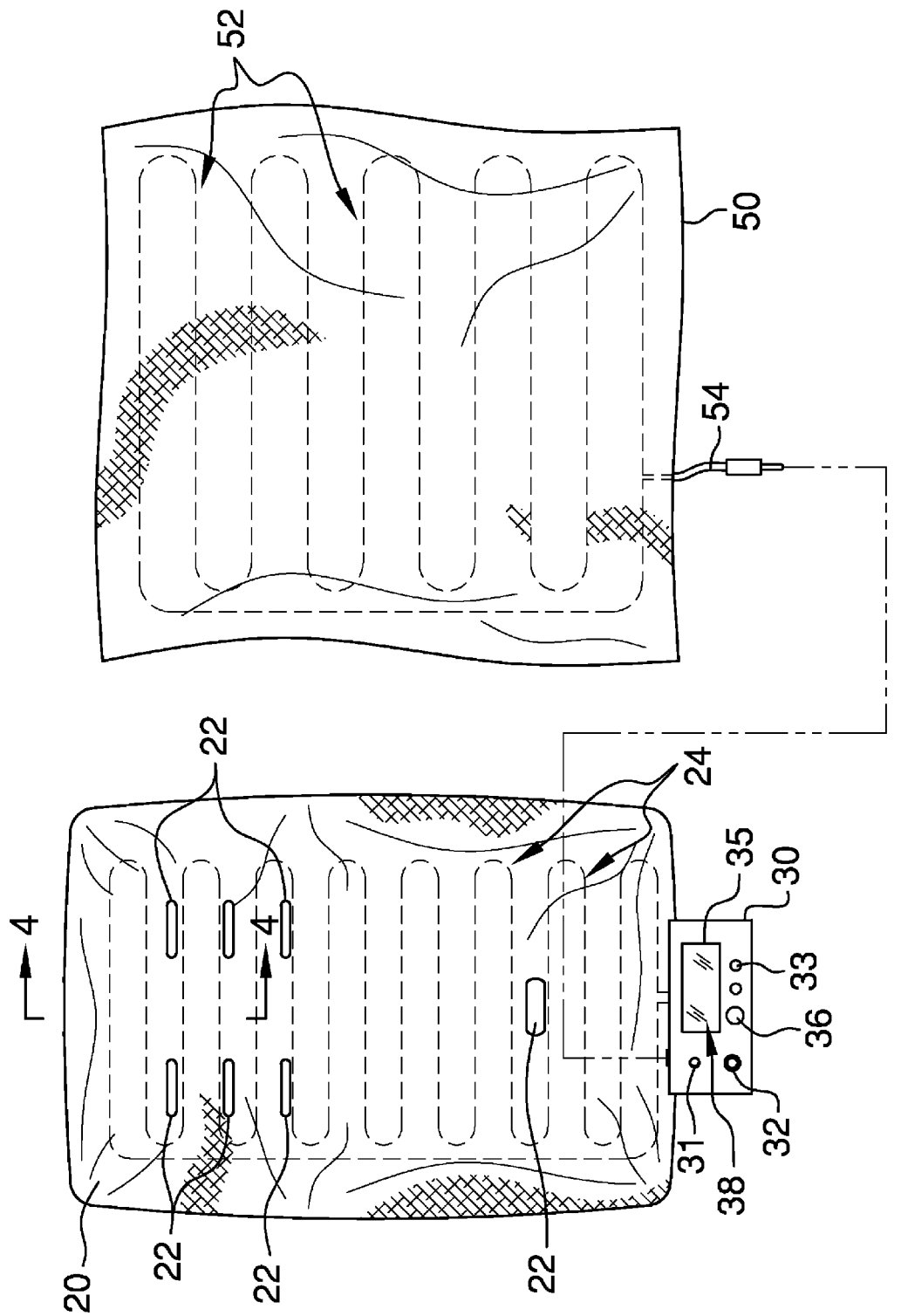
FIG. 3 is a top plan view of the seat cover and the blanket.
Figure 4:
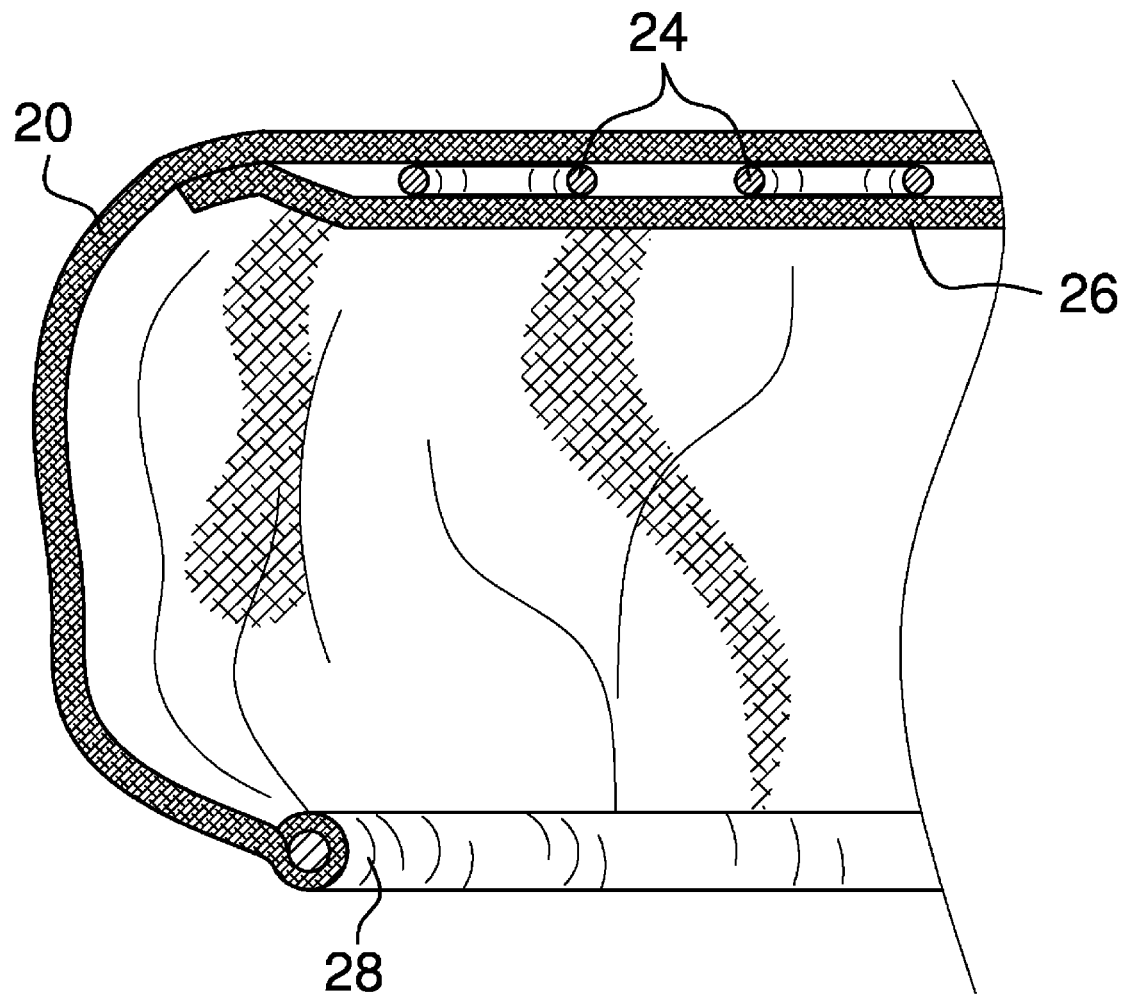
FIG. 4 is a partial cross sectional view of FIG. 3, taken along the line 4-4.
Figure 5:
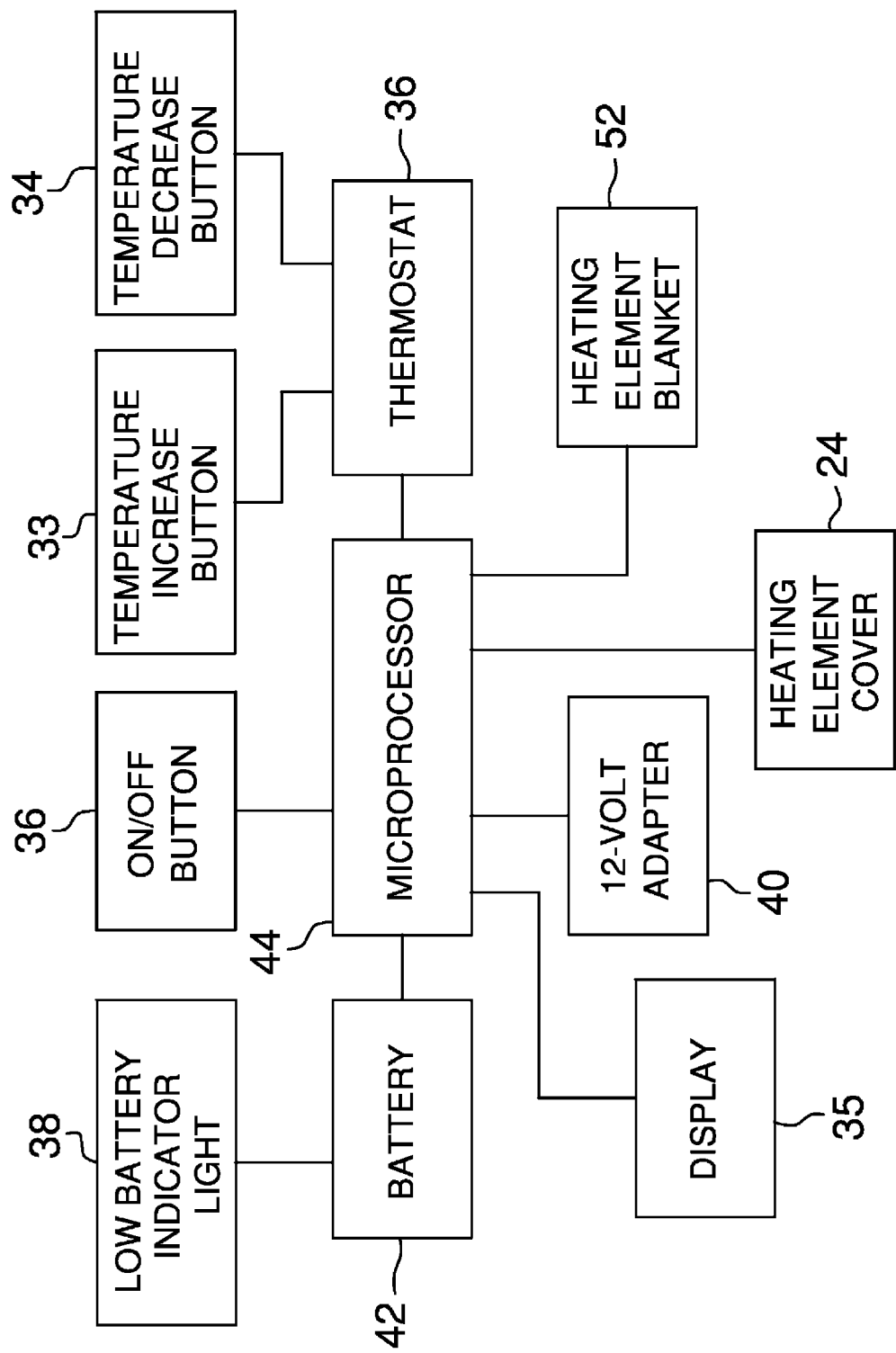
FIG. 5 is a schematic block diagram of the electronics of the apparatus.

Referring to FIGS. 3, 4, and 5, the inner layer 26 is disposed substantially throughout the seat cover 20. The coiled heating element 24 is disposed between the seat cover 20 and the inner layer 26. The plurality of spaced apart elongated openings 22 is disposed within and through the seat cover 20 and inner layer 26. The openings 22 are in removable receipt of an existing seat harness 16 of the existing seat 12. The control box 30 is in communication with the seat cover 20. The control box 30 comprises the temperature display 35, the thermostat with on/off 36, the power plug 32, and the battery 42. The low battery indicator 38 is disposed within the temperature display 35. The control box 30 further comprises the blanket plug 31 and the microprocessor 44. The microprocessor 44 is in communication with the temperature display 35, the thermostat with on/off 36, the power plug 32, the battery 42, and the blanket plug 31. The cigar lighter cord 40 is removably disposed within the power plug 32.

Referring again to FIGS. 1 and 3, the blanket 50 is provided. The blanket 50 further comprises the blanket heating element 52 disposed substantially throughout the blanket 50. The blanket plug cord 54 is extended from the blanket 50. The blanket plug cord 54 is in communication with the blanket heating element 52. The blanket plug cord 54 is removably connected to the blanket plug 31 of the control box 30 so that power is supplied to the blanket 50.

Referring again to FIGS. 1, 3, and 5, the thermostat with on/off 36 dictates the desired temperature wanted by a user by turning the thermostat with on/off 36 to the desired setting displayed within the temperature display 35. The heating element 24 and, if the blanket 50 is plugged into the blanket plug 21 of the control box 30, the blanket heating element 52 build to the temperature set by the operator. Once the temperature is reached and displayed as such, changes can be quickly made by the user by touching the temperature increase 33 or temperature decrease 34 on the control box 30. If desired, the battery 42 can be used exclusively for powering the apparatus 10. Also, if desired, the cigar lighter cord 40 can be plugged into the cigar lighter of an auto to charge the battery 42 and to power the apparatus 10.

Figure 2:
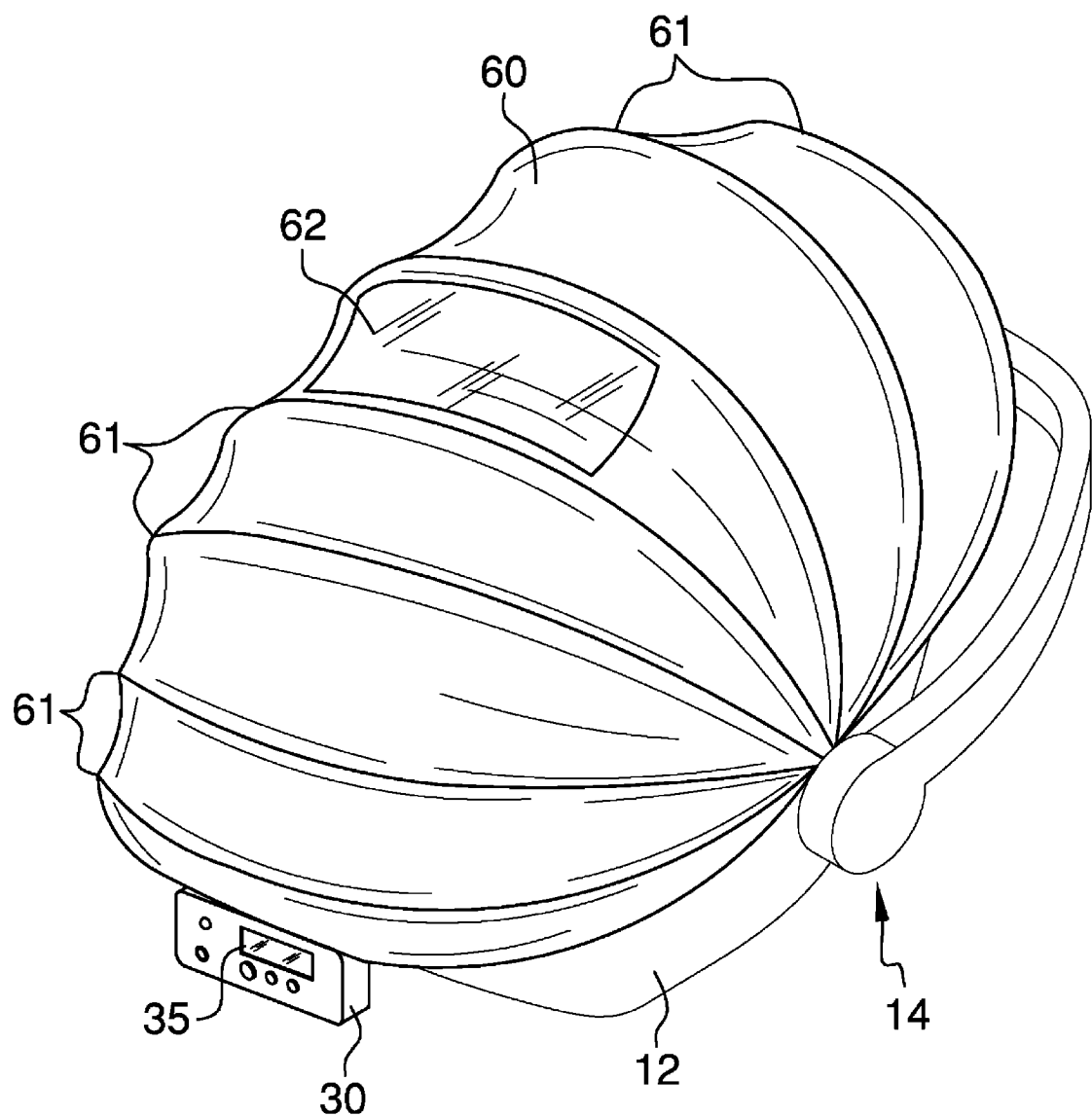
FIG. 2 is a perspective view of the accordion shield fitted to an existing child seat.

Referring to FIG. 2, the flexible accordion shield 60 is removably disposed atop the existing child seat 12. The pivot clip (not shown) is disposed centrally and downwardly on the accordion shield 60. The pivot clip is removably clipped to an existing handle pivot 14 of the seat 12. The flexible shield window 62 is disposed about centrally within the accordion shield 60. The shield 60 is collapsible such that the ribs 61 can come together, or be spread apart as is illustrated.

With respect to the above description then, it is to be realized that the optimum dimensional relationships for the parts of the thermal child seat blanket apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the thermal child seat blanket apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the thermal child seat blanket apparatus may be used.

Therefore, the foregoing is considered as illustrative only of the principles of the thermal child seat blanket apparatus. Further, since numerous modifications and changes will readily occur to those skilled in the art, it is not desired to limit the thermal child seat blanket apparatus to the exact construction and operation shown and described, and accordingly, all suitable modifications and equivalents may be resorted to, falling within the scope of the thermal child seat blanket apparatus.

What is claimed is:

1. A thermal child seat blanket apparatus comprising, in combination:
    a pliable seat cover having a perimeter;
    an elastic band disposed within the perimeter, the seat cover with elastic band perimeter removably disposed over an existing child seat;
    an inner layer disposed substantially throughout the seat cover;
    a coiled heating element disposed between the seat cover and the inner layer;
    a plurality of spaced apart elongated openings disposed within and through the seat cover and inner layer, the openings in removable receipt of an existing seat harness;
    a control box in communication with the seat cover, the control box comprising:
        a temperature display;
        a thermostat with on/off;
        a power plug;
        a battery;
        a low battery indicator disposed within the temperature display;
        a blanket plug;
        a microprocessor in communication with the temperature display, thermostat with on/off, the power plug, the battery, and the blanket plug;
    a cigar lighter cord removably disposed within the power plug;
    a blanket;
    a blanket heating element disposed substantially throughout the blanket;
    a blanket plug cord extended from the blanket, the blanket plug cord in communication with the blanket heating element, the blanket plug cord removably connected to the blanket plug;
    a flexible accordion shield removably disposed atop the existing child seat;
    a flexible shield window disposed within the accordion shield.

2. The apparatus according to claim 1 wherein the seat cover, the blanket, and the accordion shield further comprise breathability and water resistance.

* * * * *